(12) United States Patent
Kang et al.

(10) Patent No.: US 12,074,306 B2
(45) Date of Patent: Aug. 27, 2024

(54) COATING SYSTEM AND COATING METHOD FOR BATTERY

(71) Applicants: Hyundai Motor Company, Seoul (KR); Kia Corporation, Seoul (KR)

(72) Inventors: Dongjoon Kang, Seoul (KR); Hyoup Je Cho, Suwon-si (KR); SeungJun Min, Bucheon-si (KR); Sunghoon Jeong, Seoul (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 75 days.

(21) Appl. No.: 17/370,214

(22) Filed: Jul. 8, 2021

(65) Prior Publication Data

US 2022/0158158 A1 May 19, 2022

(30) Foreign Application Priority Data

Nov. 17, 2020 (KR) .................. 10-2020-0154046

(51) Int. Cl.
*H01M 4/04* (2006.01)
*B05C 11/10* (2006.01)
*B05C 5/02* (2006.01)

(52) U.S. Cl.
CPC ....... *H01M 4/0411* (2013.01); *B05C 11/1007* (2013.01); *B05C 11/1013* (2013.01); *B05C 11/1026* (2013.01); *B05C 5/0254* (2013.01)

(58) Field of Classification Search
USPC ....... 118/683, 684, 602, 712, 713, 692, 666, 118/667
See application file for complete search history.

(56) References Cited

U.S. PATENT DOCUMENTS

| 5,605,251 A | * | 2/1997 | Retti ................. B05C 5/02 222/325 |
| 6,096,370 A | * | 8/2000 | Mori ................. B28B 1/267 118/712 |

(Continued)

FOREIGN PATENT DOCUMENTS

| JP | 2010232073 A | * | 10/2010 |
| JP | 2012216375 A | * | 11/2012 |

(Continued)

OTHER PUBLICATIONS

English Translation JP-2012216375-A, Nov. 2012.*

(Continued)

*Primary Examiner* — Yewebdar T Tadesse
(74) *Attorney, Agent, or Firm* — Slater Matsil, LLP

(57) ABSTRACT

An embodiment coating system for a secondary battery includes a supply tank connected to a slot-die and configured to store a slurry, an in-line viscometer configured to measure viscosity and temperature of the slurry, a flow meter configured to measure a flow rate of the slurry, a flow rate adjustment valve configured to adjust the flow rate according to a feedback signal based on the measured flow rate, a coating bead sensor configured to detect in real time a slurry coating bead shape discharged from the slot-die to a base material, and a coating controller configured to detect a process condition change event by monitoring a slurry property and the slurry coating bead shape in real time and to control the flow rate of the flow rate adjustment valve based on reference data corresponding to a changed slurry property.

7 Claims, 12 Drawing Sheets

(56) References Cited

U.S. PATENT DOCUMENTS

| | | | |
|---|---|---|---|
| 6,217,657 B1 * | 4/2001 | Kiba | G03F 7/16 |
| | | | 118/712 |
| 6,832,577 B2 * | 12/2004 | Nesbitt | B05B 12/12 |
| | | | 118/712 |
| 2001/0012588 A1 * | 8/2001 | Kaido | H01M 4/0435 |
| | | | 118/58 |

FOREIGN PATENT DOCUMENTS

| | | | |
|---|---|---|---|
| JP | 2020163361 A | * | 10/2020 |
| KR | 20130076719 A | * | 7/2013 |

OTHER PUBLICATIONS

English Translation KR20130076719A, Jul. 2013.*
English Translation JP-2020163361-A, Oct. 2020.*
English Translation JP-2010232073-A. Oct. 2010.*

* cited by examiner

COATING SYSTEM AND COATING METHOD FOR BATTERY

CROSS-REFERENCE TO RELATED APPLICATIONS

This application claims the benefit of Korean Patent Application No. 10-2020-0154046, filed in the Korean Intellectual Property Office on Nov. 17, 2020, which application is hereby incorporated herein by reference.

TECHNICAL FIELD

The present invention relates to a coating system and a coating method for a secondary battery.

BACKGROUND

A slot-die coating method is typically used as the slurry application method of a lithium secondary battery.

The slot-die coating method uniformly applies the slurry (i.e., coating liquid) in a liquid state to the surface of the base material that is moved in a roll-to-roll method.

The most important factor required in the slot-die coating process is the uniformity of coating film thickness and reproducibility.

The secondary battery slurry is a non-Newtonian fluid, and liquid characteristics may change over time. This variability causes several problems in the slot-die coating method. Among them, the biggest problem is the uniformity deterioration of the slurry loading level (L/L) applied to the base material. The L/L is a very important factor for critical-to-quality (CTQ), which is directly linked to secondary battery capacity, and therefore specification management is strictly carried out.

FIG. 12 shows a slurry supply and circulation structure in the conventional slot-die coating process.

Referring to FIG. 12, in the process of the conventional coating, a ball valve blocks an upper end portion of the slot-die and the slurry is supplied to a slot-die discharge portion (frequently called a Lip). When the coating is stopped, the discharge portion of the slot-die is blocked and the ball valve is opened to circulate the slurry to the slurry supply tank.

However, at the beginning of the coating operation, due to the viscosity of the slurry, the length of the pipe, and the like, the pressure may not be formed sufficiently for slot-die coating, and the cost may increase due to the loss of slurry and base material due to the non-formation of the discharge pressure.

Conventionally, a field-customized method is utilized, in which an on-site worker sets the coating process condition according to the variability characteristic of the slurry.

In such a conventional coating process, poor quality during coating may occur due to the absence of automatic control factors, and the coating quality depends on the worker's know-how to cope with changes in coating conditions due to changes in slurry properties.

However, since the process condition that affects the coating quality of secondary batteries depends on the know-how of workers in the field, uniformity of coating quality is deteriorated, human error occurs, and it is difficult to establish work standards.

Due to this, coating quality, process yield, and electrode quality may depend on the worker's skill level. Furthermore, when it is impossible to identify the cause and an appropriate action for the coating defects, all of the product may be discarded.

The above information disclosed in this Background section is only for enhancement of understanding of the background of the invention, and therefore it may contain information that does not form the prior art that is already known to a person of ordinary skill in the art.

SUMMARY

An exemplary coating system for a secondary battery is provided for coating a base material by a slot-die with slurry supplied through piping, where the coating system includes a supply tank connected to the slot-die and configured to store the slurry, an in-line viscometer configured to measure viscosity and temperature of the slurry, a flow meter configured to measure a flow rate of the slurry, a flow rate adjustment valve configured to adjust the flow rate according to a feedback signal based on the flow rate measured by the flow meter, a coating bead sensor configured to real time detect a slurry coating bead shape discharged from the slot-die to the base material, and a coating controller configured to detect a process condition change event by monitoring a slurry property and a coating bead shape in real time, and control the flow rate of the flow rate adjustment valve based on reference data corresponding to a changed slurry property.

The exemplary coating system may further include a pulseless pump configured to generate a pressure in the piping, a 3-way valve configured to convert a flow direction of the slurry from a main line from the pulseless pump to a supply line toward the slot-die or a circulation line toward the supply tank, a solenoid valve configured to open or close the circulation line, and at least one pressure sensor installed in the piping and configured to measure slurry pressure.

The coating controller may be configured to control the piping according to a circulation mode during a standby for a coating operation, a supply mode during the coating operation, and a shut-off mode after finishing the coating operation. In an initial stage of the coating operation, the coating controller may be configured to control the piping to the shut-off mode to form a slurry pressure in the main line higher than a basic slurry supply pressure of the pulseless pump.

The coating controller may be configured to, in the circulation mode, control the flow rate adjustment valve to be open, control the 3-way valve to be open with respect to the circulation line and closed with respect to the supply line, and control the solenoid valve to be open.

The coating controller may be configured to, in the supply mode, control the flow rate adjustment valve to be open, control the 3-way valve to be open with respect to the supply line and closed with respect to the circulation line, and control the solenoid valve to be closed.

The coating controller may be configured to, in the shut-off mode, control the flow rate adjustment valve to be open, control the 3-way valve to be open with respect to the circulation line and closed with respect to the supply line, and control the solenoid valve to be closed.

The flow rate adjustment valve may be configured to adjust the flow rate to match the reference data according to a feedback signal applied by the coating controller based on volume and mass of the slurry measured by the flow meter.

The flow rate adjustment valve may be configured to adjust the flow rate to form a same pressure in the circulation mode and the supply mode.

The coating bead sensor may include at least one of a vision sensor, a laser, an ultrasonic wave, and a photodiode that may detect the coating bead shape.

The coating controller may include an interface module connected to various sensors and devices configured in the coating system for a secondary battery and configured to collect measured status data and transfer corresponding signals, a monitoring module configured to analyze the status data to detect the process condition change event according to at least one property change of viscosity, a temperature, and a flow rate of the slurry, a process condition setting module configured to accumulate the status data over time to a database and generate reference data for forming normal coating bead of the slot-die correlated to the status data, a display module configured to display various information generated during a coating operation and alarm an event situation, and a control module configured to adjust the process condition based on reference data matching a cause of the process condition change.

The monitoring module may be configured to analyze the slurry coating bead shape to detect the process condition change event according to at least one of insufficient slurry supply, excessive slurry supply, and abnormal base material transfer speed.

The control module may be configured to control, in accordance with the adjustment of the process condition, at least one of pressure frequency adjustment of a pulseless pump, moving speed adjustment of the base material, gap adjustment between the slot-die and the base material, and flow rate adjustment of the flow rate adjustment valve.

An exemplary coating method for a secondary battery utilizes a coating controller of a coating system that coats a base material by a slot-die with slurry supplied through piping, where the coating method includes monitoring status data measured by sensors and devices of the coating system, detecting a process condition change event according to at least one property change of viscosity, temperature, and flow rate of the slurry by analyzing the status data, controlling the flow rate adjustment valve installed in the piping to adjust the flow rate based on reference data matching a slurry property changed by the process condition change event, storing the status data collected over time in a database, and generating reference data for normal coating bead formation of the slot-die correlated to the status data.

Monitoring the status data may include monitoring pressures in respective lines of a main line, a supply line, and a circulation line in the piping, monitoring slurry property of viscosity and temperature through an in-line viscometer installed in the main line, monitoring a slurry flow rate measured through a flow meter installed in the main line, and monitoring a slurry coating bead shape through a coating bead sensor positioned in the slot-die.

Detecting the process condition change event may include analyzing a slurry coating bead shape of the status data to detect the process condition change event according to at least one of insufficient slurry supply, excessive slurry supply, and abnormal base material transfer speed.

Controlling the flow rate adjustment valve may include deriving at least one cause of change among excessive coating speed and insufficient discharge pressure by using a slurry property factor analyzed based on current status data, and adjusting the process condition adaptively to the process condition change event by applying a feedback control based on reference data matching the cause of change.

The exemplary coating method may further include controlling an initial slurry flow rate at an initial stage of a coating operation, before monitoring the status data, where controlling the initial slurry flow rate may include controlling the piping to a slurry shut-off mode and operating a pulseless pump to increase a slurry pressure in the piping, and controlling the piping to a slurry supply mode and controlling the flow rate adjustment valve to decrease a cross-section of the flow rate adjustment valve.

The exemplary coating method may further include, after increasing the initial slurry flow rate, adjusting, in a feedback control manner, the flow rate of the flow rate adjustment valve to be appropriate for reference data matching the slurry property of volume and mass of slurry measured by a flow meter.

According to an exemplary embodiment, the loading level (L/L) uniformity, an important specification item of coating operation, may be secured by automatically controlling the adjustment of the process condition according to the slurry property change in real time.

In addition, by obtaining status data through an in-line viscometer and a coating bead sensor, and performing control adapted to process condition changes based on the reference data, it is possible to improve electrode quality and establish a standard working method.

In addition, in the initial stage of the coating operation, slurry flow rate may be compensated by controlling the piping configuration to the shut-off mode and controlling the flow rate adjustment valve, and thus, coating discharge pressure may be promptly achieved, thereby preventing loss of slurry and base material.

Figure 1:
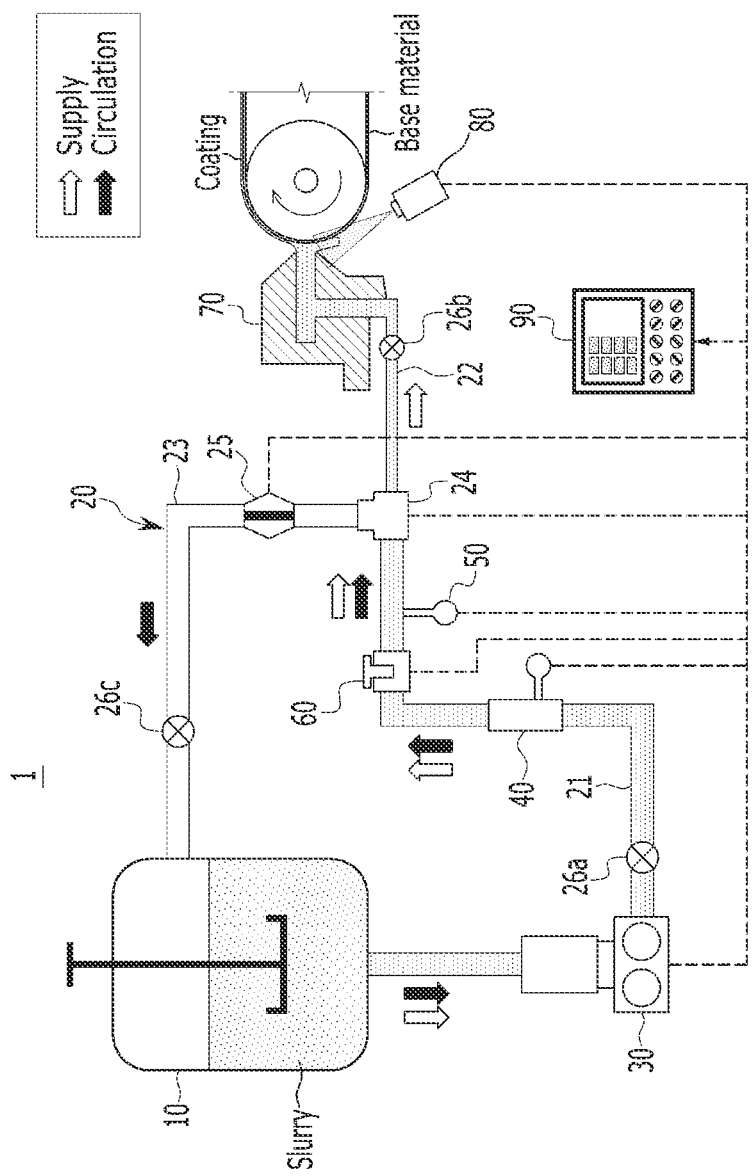
FIG. 1 schematically illustrates a piping configuration of a coating system for a secondary battery according to an exemplary embodiment.

The following elements may be used in connection with the drawings to describe embodiments of the present invention.

1: a coating system for a secondary battery
10: supply tank
20: piping
21: main line
22: supply line
23: circulation line
24: 3-way valve
25: solenoid valve
26: pressure sensors
30: pulseless pump
40: in-line viscometer
50: flow meter
60: the flow rate adjustment valve
70: slot-die
80: coating bead sensor
90: coating controller
91: interface module
92: monitoring module
93: condition setting module
94: database (DB)
95: display module
96: control module

DETAILED DESCRIPTION OF ILLUSTRATIVE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and the nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

The terms used herein are used only for the purpose of describing particular exemplary embodiments and are not intended to limit the present invention. Singular expressions include plural expressions unless clearly described as different meanings in the context.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Unless otherwise defined herein, all terms including technical or scientific terms used herein have the same meaning as commonly understood by one of ordinary skill in the art to which the present invention belongs. Terms such as those defined in a commonly used dictionary should be interpreted as being consistent with the meaning in the context of the related technology, and are not interpreted in an ideal or excessively formal meaning unless explicitly defined in the present specification.

Hereinafter, a coating system and coating method for a secondary battery according to an exemplary embodiment is described in detail with reference to the drawings.

FIG. 1 schematically illustrates a piping configuration of a coating system for a secondary battery according to an exemplary embodiment.

Figure 2:
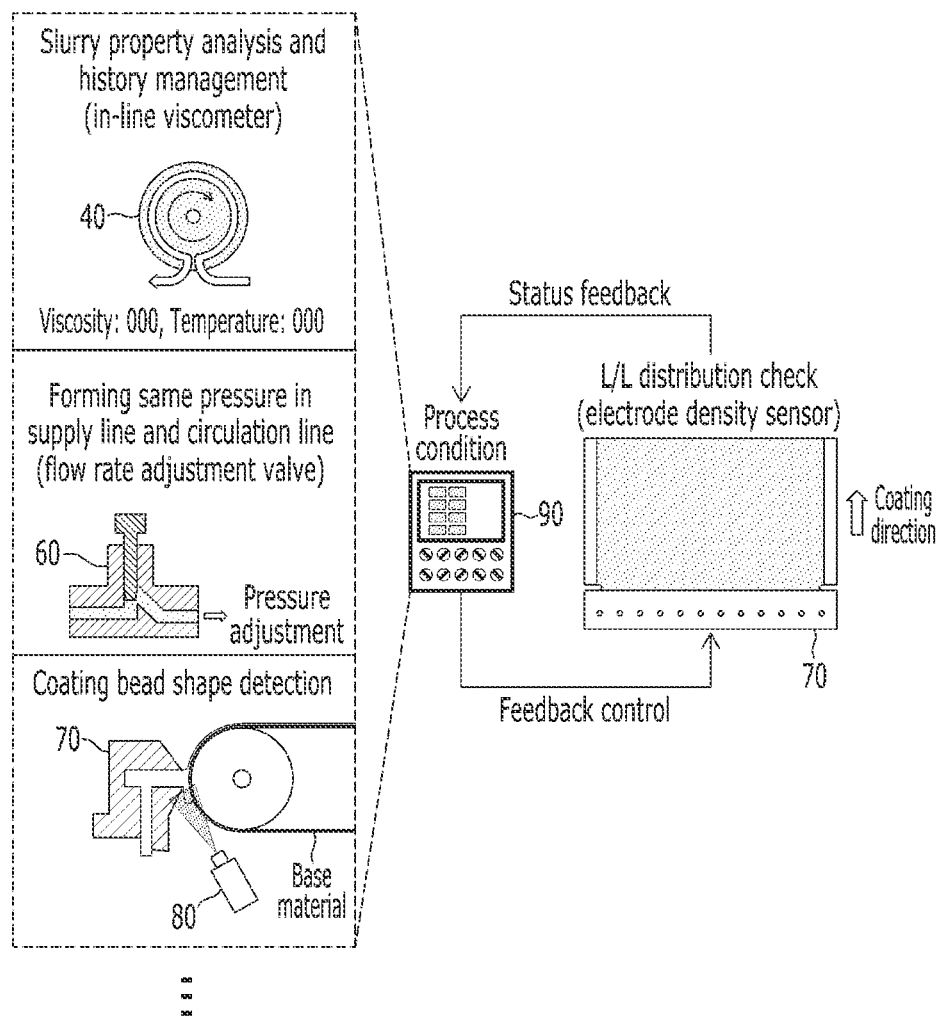
FIG. 2 shows the control concept of a coating system for a secondary battery according to an exemplary embodiment.

FIG. 2 shows the control concept of a coating system for a secondary battery according to an exemplary embodiment.

Referring to FIG. 1 and FIG. 2, a coating system 1 for a secondary battery according to an exemplary embodiment includes a supply tank 10, a piping 20, a pulseless pump 30, an in-line viscometer 40, a flow meter 50, a flow rate adjustment valve 60, a slot-die 70, a coating bead sensor 80, and a coating controller 90.

The supply tank 10 stores the slurry (i.e., coating liquid) generated in the slurry mixing process of a previous stage (not shown).

The slot-die 70 is configured to coat a base material with the slurry supplied from the supply tank 10.

The piping 20 flows the slurry discharged from the supply tank 10 at the pressure of the pulseless pump 30 and supplies it to the slot-die 70.

The piping 20 includes a main line 21, a supply line 22, and a circulation line 23. The main line 21 is connected to the supply tank 10 through the pulseless pump 30, and is connected to the supply line 22 and the circulation line 23 through a 3-way valve 24. The supply line 22 is connected to the slot-die 70 to supply the slurry of the main line 21 to the slot-die 70. The circulation line 23 is connected to the supply tank 10 to return or circulate the slurry of the main line 21 to the supply tank 10. That is, the 3-way valve 24 is configured to convert a flow direction of the slurry from the main line 21 to the supply line 22 or the circulation line 23.

The pulseless pump 30 is a pump that minimizes a flow rate deviation (e.g., to 1-3%) by removing pulsation compared to a general pump.

The pulseless pump 30 is connected to the supply tank 10 and the main line 21 and is configured to generate a pressure in the main line 21. Therefore, the pulseless pump 30 is configured to supply the slurry stored in the supply tank 10 to the main line 21.

The flow rate adjustment valve 60 is installed in the main line 21 and is configured to control the flow rate of the slurry flowing through the main line 21 in response to a control signal.

The in-line viscometer 40 is installed in the main line 21 and is configured to measure, in real time, a slurry property such as viscosity and temperature of the slurry flowing through the main line 21.

The flow meter 50 is installed in the main line 21 and is configured to measure the flow rate of the slurry flowing through the main line 21, for example, the volume and mass of the slurry passing through a unit cross-section per time.

The 3-way valve 24 has an input end connected to the main line 21, and two output ends that are respectively connected to the supply line 22 toward the slot-die 70 and the circulation line 23 toward the supply tank 10, thereby forming a branched structure.

In response to a control signal, the 3-way valve 24 converts the flow direction of the slurry from the main line 21 to the supply line 22 toward the slot-die 70 or to the circulation line 23 toward the supply tank 10.

A solenoid valve 25 is installed in the circulation line 23 and is configured to open or close the circulation line 23.

In response to a control signal, the solenoid valve 25 is turned on to open or turned off to close the circulation line 23. In a standby for the coating operation, the solenoid valve 25 may be controlled to open the circulation line 23 to circulate the slurry to the supply tank 10. In an initial stage of the coating operation, the solenoid valve 25 may be controlled to close the circulation line 23 to form additional coating pressure to compensate possibly insufficient coating pressure.

The coating bead sensor 80 is positioned in the slot-die 70 and is configured to detect, in real time, a slurry coating bead shape discharged from the slot-die 70 to the base material.

Pressure sensors 26 are installed in the piping 20 to measure pressure in the piping 20. In more detail, the pressure sensors 26 include a first pressure sensor 26a, a second pressure sensor 26b, and a third pressure sensor 26c.

The first pressure sensor 26a is installed in the main line 21 and is configured to measure a slurry pressure in the main line 21. Specifically, the first pressure sensor 26a may be installed between the pulseless pump 30 and the in-line viscometer 40.

The second pressure sensor 26b is installed in the supply line 22, that is, between the 3-way valve 24 and the slot-die 70, and is configured to measure a slurry pressure in the supply line 22.

The third pressure sensor 26c is installed in the circulation line 23 and is configured to measure a slurry pressure in the circulation line 23. Specifically, the third pressure sensor 26c may be installed between the solenoid valve 25 and the supply tank 10.

The coating controller 90 controls an overall operation of the coating system 1 for a secondary battery according to an exemplary embodiment. The coating controller 60 is configured to detect a process condition change event by monitoring a slurry property and a coating bead shape in real time and to control the flow rate of the flow rate adjustment valve 60 based on reference data corresponding to a changed slurry property, which will be later described in detail. Under the control of the coating controller 90, the piping configuration of the coating system 1 for a secondary battery is operated according to a circulation mode during a standby for the coating operation, a supply mode during the coating operation, and a shut-off mode after finishing the coating operation.

Figure 3:
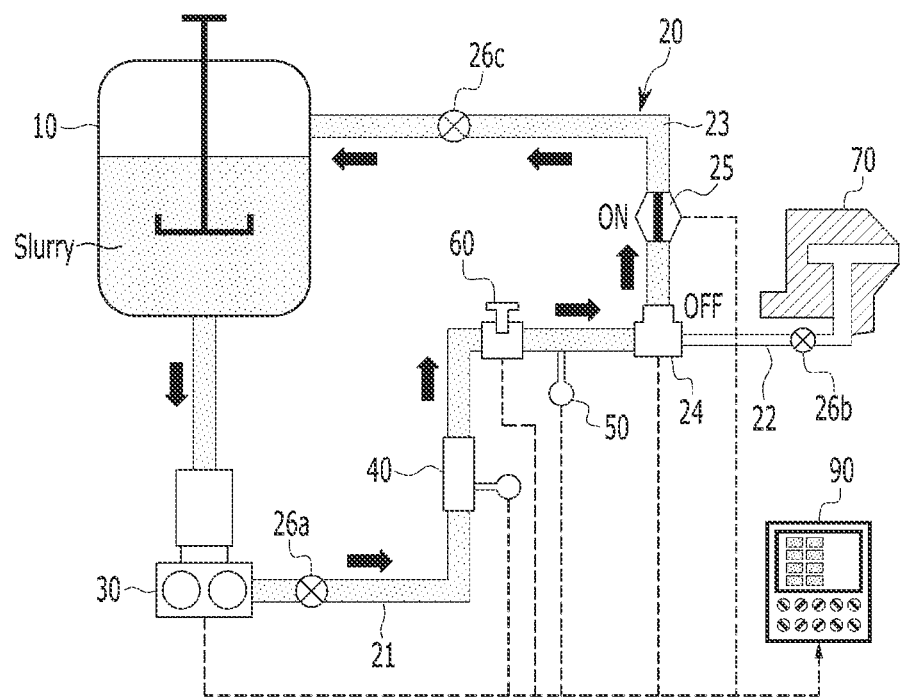
FIG. 3 shows a circulation mode of a piping configuration according to an exemplary embodiment.

FIG. 3 shows a circulation mode of the piping configuration according to an exemplary embodiment.

Referring to FIG. 3, during the standby for the coating operation or when the coating operation is temporarily intermitted, the coating controller 90 controls the piping configuration to the circulation mode by converting the flow direction of the slurry to the supply tank 10.

That is, in the circulation mode, the coating controller 90 controls the flow rate adjustment valve 60 to be open, controls the 3-way valve 24 to be open with respect to the circulation line 23 and closed with respect to the supply line 22, and controls the solenoid valve 25 to be open. In the circulation mode, slurry flow rate and pressure satisfying an L/L specification may be formed. That is, while the slurry is not supplied to the supply line 22, the slurry flow rate and pressure may be maintained appropriately for forming sufficient discharge pressure of the slot-die 70, so as to standby to supply the slurry to the supply line 22.

Figure 4:
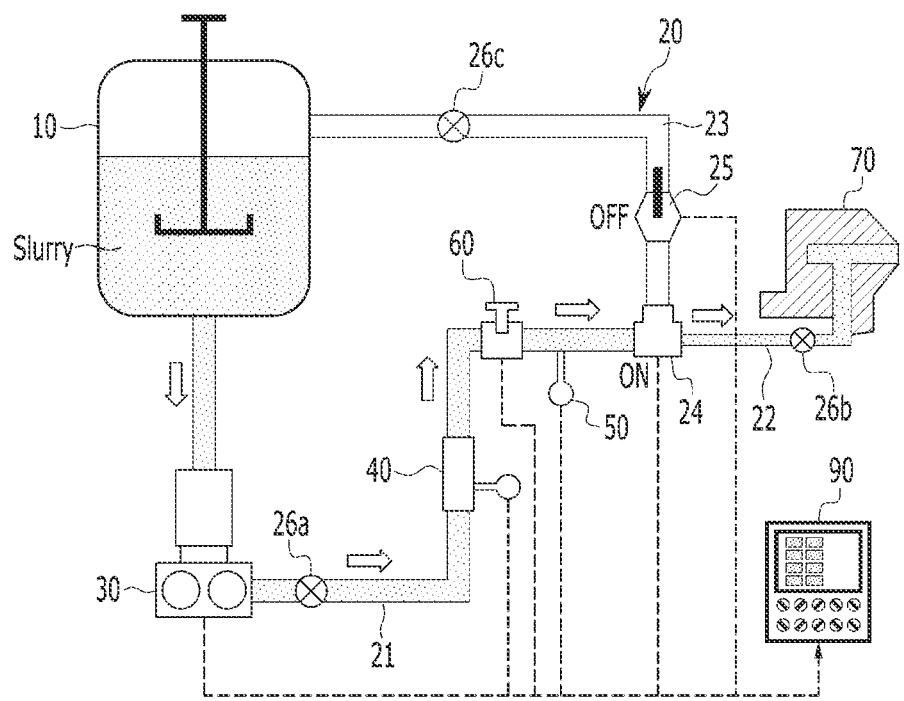
FIG. 4 shows a slurry supply mode according to an exemplary embodiment.

FIG. 4 shows a slurry supply mode according to an exemplary embodiment.

Referring to FIG. 4, during the coating operation, the coating controller 90 controls the piping configuration to the supply mode in which the flow direction of the slurry is directed toward the slot-die 70.

In the supply mode, the coating controller 90 controls the flow rate adjustment valve 60 to be open, controls the 3-way valve 24 to be open with respect to the supply line 22 and closed with respect to the circulation line 23, and controls the solenoid valve 25 to be closed. In the supply mode, the discharge pressure of the slot-die 70 may be formed to a sufficient slurry flow rate and pressure that satisfies the L/L specification.

Figure 5:
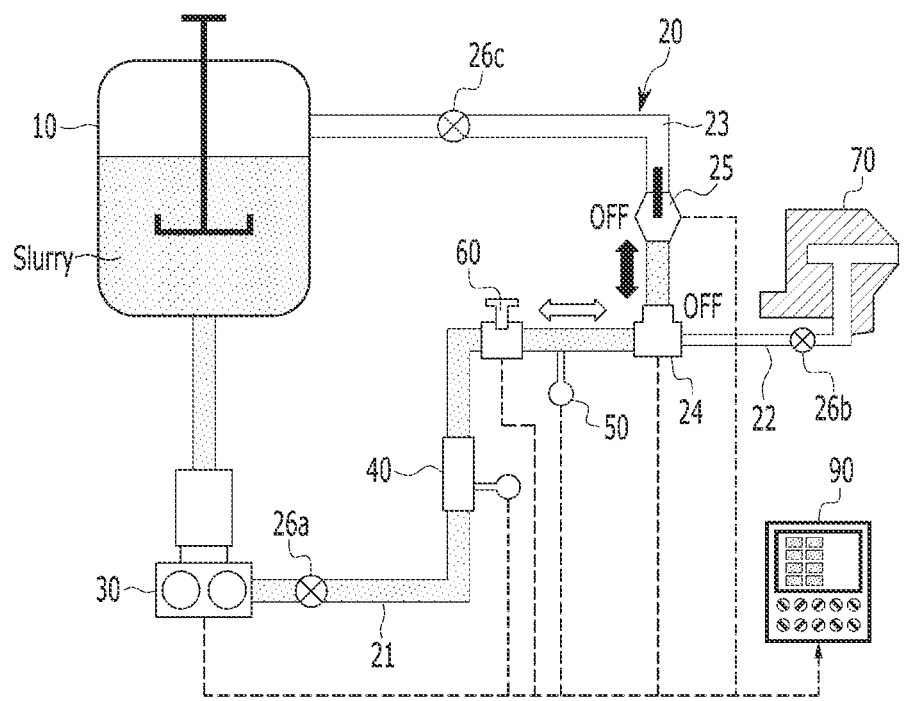
FIG. 5 shows a slurry shut-off mode according to an exemplary embodiment.

FIG. 5 shows a slurry shut-off mode according to an exemplary embodiment.

Referring to FIG. 5, in the initial stage of the coating operation or when the coating operation is finished, the coating controller 90 controls the piping configuration to the shut-off mode in which the slurry pressure in the piping 20 is increased to form an additional pressure to compensate the discharge pressure of the slot-die 70.

In the shut-off mode, the coating controller 90 controls the flow rate adjustment valve 60 to be open, controls the 3-way valve 24 to be open with respect to the circulation line 23 and closed with respect to the supply line 22, and controls the solenoid valve 25 to be closed. At this time, in the initial stage of the coating operation, when the pulseless pump 30 is operated in the shut-off mode, the pipe pressure along the main line 21 and the circulation line 23 between the pulseless pump 30 and the solenoid valve 25 is increased. In this case, when the coating controller 90 switches the shut-off mode to the supply mode, the pipe pressure increased from a basic slurry supply pressure of the pulseless pump 30 is supplied to the slot-die 70 and therefore a sufficient discharge pressure of the slot-die 70 may be formed.

In addition, the coating controller 90 may be switched to a manual mode, such that a worker may manually convert the piping configuration among the circulation mode, the supply mode, and the shut-off mode.

In order to control the piping configuration, the coating controller 90 receives data from the pressure sensors 26, the in-line viscometer 40, the flow meter 50, and the coating bead sensor 80, and based on the received data, controls the 3-way valve 24, the solenoid valve 25, and the flow rate adjustment valve 60.

During the coating operation, the slurry property may be changed due to various reasons, for example, by adding additional slurry to the supply tank 10, which causes a temperature change of the slurry.

The slurry property such as viscosity and temperature changed during the coating operation may affect a process condition such as a coating pressure, a slurry flow rate, a drying condition, a coating speed, and the like, and therefore, may be a cause resulting in deviation or defect of coating loading level (L/L).

Therefore, the data from the in-line viscometer 40 is considered to adjust the coating process condition according to the slurry property changed in real time.

In addition, the data measured by the in-line viscometer 40 is utilized to generate reference data for setting a process condition appropriate for a slurry property change, and a history of the slurry property data is stored and managed.

The flow rate adjustment valve 60 is configured to adjust the flow rate of the slurry in the main line 21 according to a feedback signal based on the flow rate measured by the flow meter 50. The flow rate adjustment valve 60 may adjust the flow rate by changing the cross-section of the main line 21.

The flow rate adjustment valve 60 may adjust the flow rate to match the reference data according to a feedback signal applied by the coating controller based on the volume and mass of the slurry measured by the flow meter. The flow rate adjustment valve 60 may adjust the slurry pressure in the main line 21 to be appropriate for reference data in a desired process condition, by adjusting the slurry flow rate through the main line 21.

The flow rate adjustment valve 60 is configured to adjust the flow rate to form a same slurry pressure in the circulation mode and the supply mode, and thereby prevents a coating defect due to insufficient slurry supply and excessive slurry supply of the slot-die 70.

For example, in a conventional coating process, when switching from the slurry supply mode to the circulation mode, pressure is relieved, and therefore, when switching back to the supply mode, the discharge pressure of the slot-die is formed low. This causes poor coating because, during initial coating, the slurry supply pressure in the slot-die is insufficient and discharge pressure suitable for appropriate L/L distribution is not formed.

Since the flow rate adjustment valve 60 maintains the same pressure in the supply mode and the circulation mode, the pressure drop phenomenon may be compensated for when switching from the circulation mode to the supply mode.

In addition, the flow rate adjustment valve 60 may compensate for the pressure insufficient in the discharge pressure of the slot-die 70 at the beginning of the coating operation.

Figure 6:
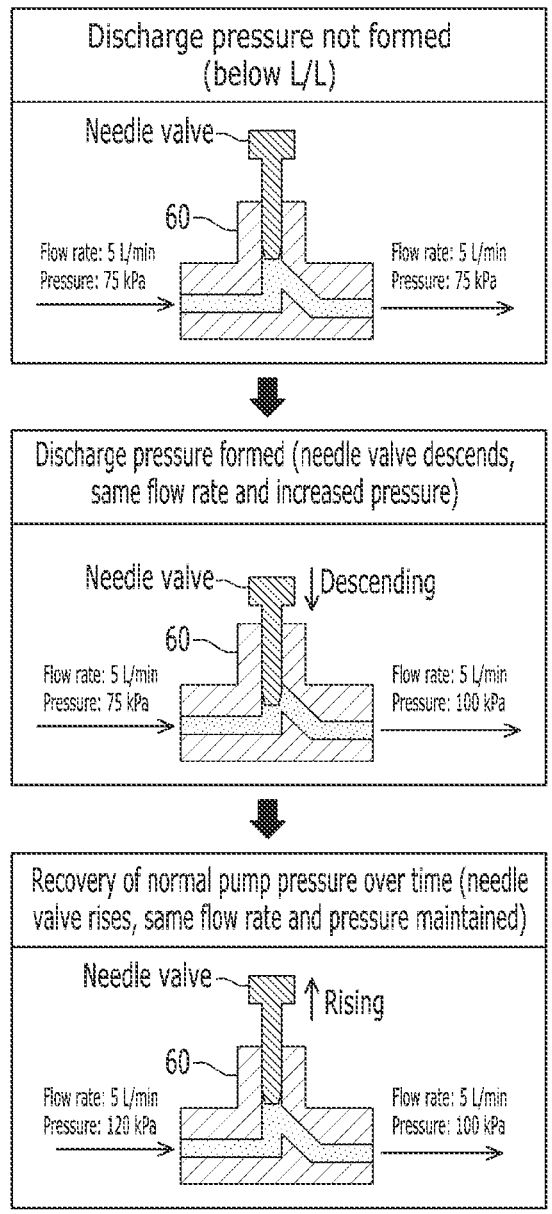
FIG. 6 shows an operation state of a flow rate adjustment valve according to an exemplary embodiment.

FIG. 6 shows an operation state of a flow rate adjustment valve according to an exemplary embodiment.

Referring to FIG. 6, in general, the flow rate depends on the area of a pipe and a flow speed of fluid, and does not directly depend on the pressure of the pipe. The slurry pressure is proportional to the square of a ratio of flow speed. Therefore, the change in the slurry flow rate has an effect on the pressure loss. This may cause the initial discharge pressure in the slurry supply mode to not be sufficiently formed, resulting in a poor loading level (L/L) of the slot-die 70, as shown in the top diagram of FIG. 6.

In an embodiment, the flow rate adjustment valve 60 supports rapid forming of a normal discharge pressure by compensating the pressure by lowering the needle valve when entering the slurry supply mode initially.

That is, as shown in the middle diagram of FIG. 6, the needle valve of the flow rate adjustment valve 60 is lowered to decrease a cross-section of the pipe while maintaining the flow rate the same. In this case, the flow speed increases at the downstream side of the flow rate adjustment valve 60 even if the flow rate and the pressure at the upstream side remain the same. Therefore, the pressure at the downstream side of the flow rate adjustment valve 60 is increased, e.g., from 75 kPa at the upstream side to 100 kPa at the downstream side. Such increase in pressure may help rapid forming of required pressure at the slot-die 70 at the initial stage of the coating operation.

After the initial stage of the coating operation, when the pressure of the upstream side of the flow rate adjustment valve 60 becomes excessively high, e.g., to 120 kPa above the 100 kPa of the desired discharge pressure of the slit-die 70, or when an actual discharge pressure of the slit-die 70 becomes the desired discharge pressure of 100 kPa, the needle valve is gradually raised to increase the cross-section of the flow rate adjustment valve 60. Thus, the desired discharge pressure of the slot-die 70 may be rapidly achieved at the initial stage of the coating operation, and may be stably maintained during the coating operation, e.g., by a feedback control based on the pressures in the piping 20 and the signals of the coating bead sensor 80.

In this background, the coating bead sensor 80 detects a slurry coating bead shape discharged from the slot-die 70 to the base material in real time through a vision sensor and transfers it to the coating controller 90.

However, the coating bead sensor 80 is not limited to a vision sensor and may be configured by applying at least one of a laser, an ultrasonic wave, and a photodiode that may detect the shape of the coating bead.

The coating controller 90 may be formed as a programmable logic controller (PLC) and a computing system that control the overall operation of the coating system 1 for a secondary battery according to an exemplary embodiment.

The coating controller 90 is configured to detect a process condition change event by monitoring the slurry property and the coating bead shape in real time, and automatically control the process condition stably, by feedback controlling the flow rate of the flow rate adjustment valve 60 based on reference data corresponding to a changed slurry property.

Figure 7:
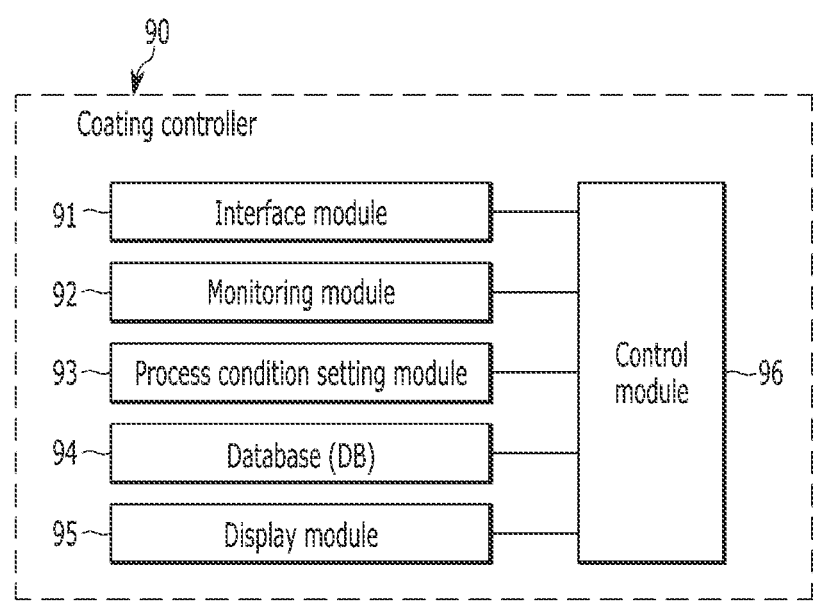
FIG. 7 is a block diagram schematically showing the configuration of a coating controller according to an exemplary embodiment.

FIG. 7 is a block diagram schematically showing the configuration of a coating controller according to an exemplary embodiment.

Referring to FIG. 7, the coating controller 90 according to an exemplary embodiment includes an interface module 91, a monitoring module 92, a process condition setting module 93, a database (DB) 94, a display module 95, and a control module 96.

The interface module 91 is connected to various sensors and devices configured in the coating system 1 for a secondary battery to collect measured status data and transfer corresponding signals to the control module 96, and to transfer control signals of the control module 96 to outside, e.g., to the flow rate adjustment valve 60, the solenoid valve 25, and the 3-way valve 24.

For example, the status data may include a pulseless pump operation state, a pipe pressure in each line, viscosity and temperature of the slurry, slurry flow rate, a flow rate adjustment valve operation state, 3-way valve operation state, a solenoid operation state, a slot-die operation state, a slurry coating bead shape, a base material transfer speed, and the like.

The monitoring module 92 detects the coating process condition change event by monitoring the overall operation of the coating system 1 for a secondary battery based on the collected status data.

For example, the monitoring module 92 may analyze the status data to detect the process condition change event according to at least one property change of the viscosity, the temperature, and/or the flow rate of the slurry.

In addition, the monitoring module 92 may analyze the slurry coating bead shape collected by the coating bead sensor 80 to detect the process condition change event according to at least one of insufficient slurry supply, excessive slurry supply, and abnormal base material transfer speed.

The process condition setting module 93 accumulates the history of the status data over time to the DB 94 and generates reference data for forming a normal coating bead of the slot-die 70 correlated to the status data. The status data and the reference data are used as factors to automatically adjust the process condition according to the changed condition when a process condition change event occurs in the future.

Figure 8:
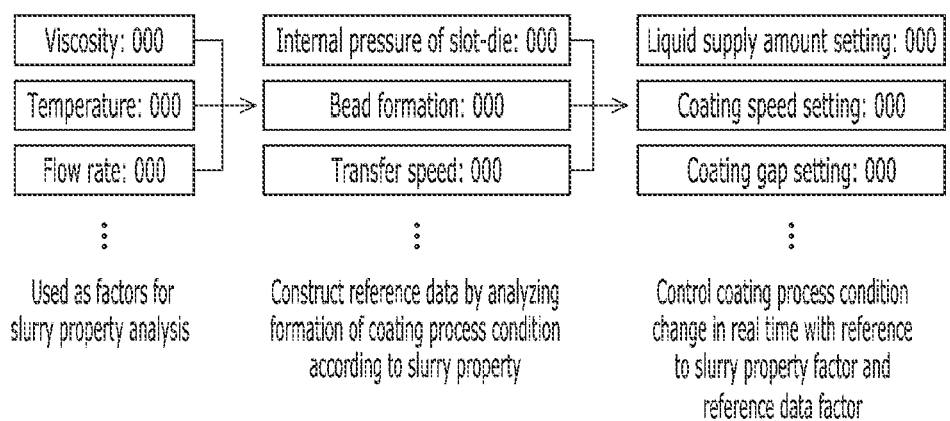
FIG. 8 illustrates a generation and utilizing method of reference data according to an exemplary embodiment.

FIG. 8 illustrates a generation and utilizing method of reference data according to an exemplary embodiment.

Referring to FIG. 8, for example, the process condition setting module 93 constructs reference data for adjusting, for example, the slurry flow rate according to at least one property change of the viscosity, the temperature, and the flow rate of the slurry.

At this time, the process condition setting module 93 may construct reference data for normal operation by analyzing the current coating process condition according to the slurry property.

This constructed slurry property factor and reference data factor supports real time coating process condition change control with reference to the changed property factor and reference data factor in the control module 96 when a process condition change event occurs later.

The DB 94 stores various programs and data for operation of the coating system 1 for a secondary battery according to an exemplary embodiment, and stores status data and reference data generated according to the operation.

The display module 95 may display various information generated during the operation of the coating system 1 for a secondary battery and alarm an event situation.

The control module 96 controls the overall operation of the respective modules for the operation of the coating system 1 for a secondary battery according to an exemplary embodiment.

For this purpose, the control module 96 may be implemented with at least one processor operated by a preset program, and the preset program may be programmed to perform each step of a coating method for a secondary battery according to an exemplary embodiment.

This coating method for a secondary battery is described in more detail with reference to the drawings.

Figure 9:
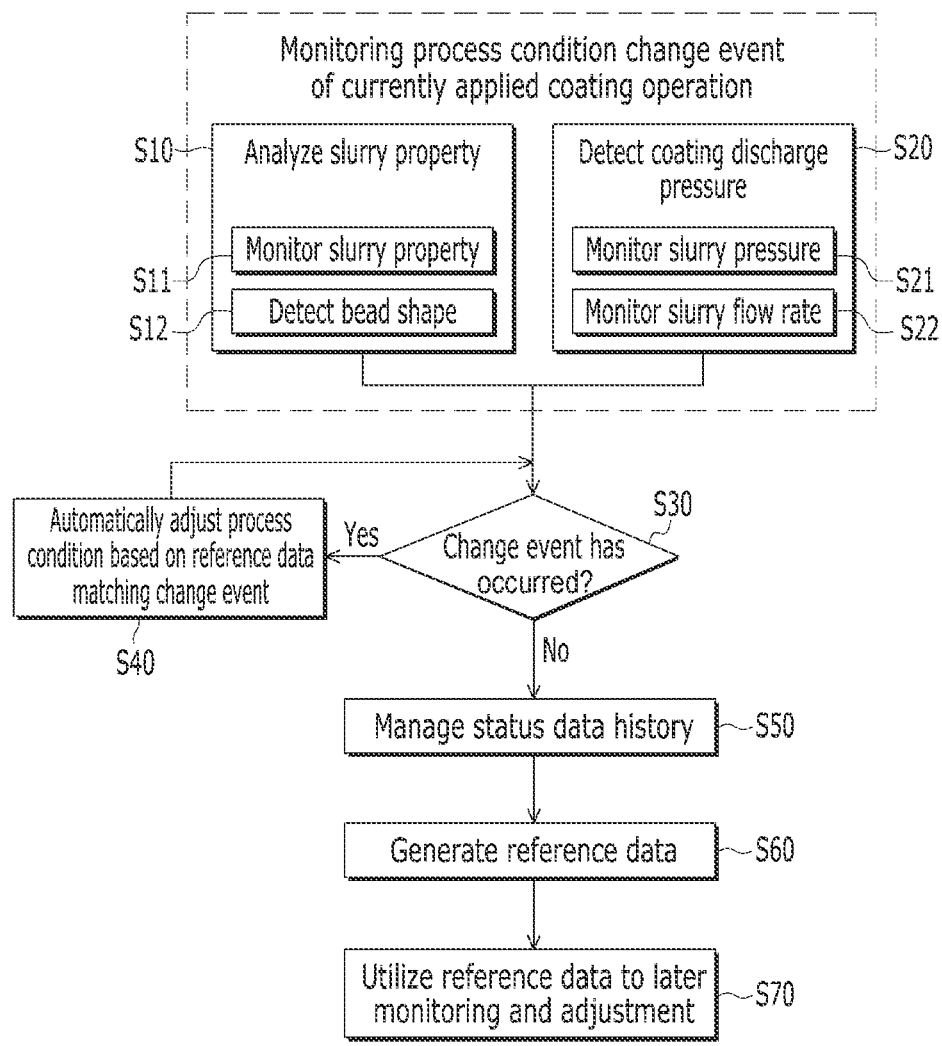
FIG. 9 is a flowchart schematically showing a coating method for a secondary battery according to an exemplary embodiment.

FIG. 9 is a flowchart schematically showing a coating method for a secondary battery according to an exemplary embodiment.

Referring to FIG. 9, in a coating method for a secondary battery according to an exemplary embodiment, it is supposed that, while reference data for process condition adjustment with the factor of the slurry property is established, the coating operation is initiated and the piping configuration has entered the slurry supply mode.

The control module 96 monitors and collects status data of the coating system measured by various sensors (e.g., the in-line viscometer 40, the first to third pressure sensors 26a, 26b, and 26c, and the coating bead sensor 80) and devices (e.g., the flow meter 50) of the coating system 1 for a secondary battery during the coating operation. The control module 96 analyzes the status data to detect a process condition change event of a currently applied coating operation.

As described above in connection with the coating system embodiment, the status data may include a pulseless pump operation state, a pipe pressure in each line, viscosity and temperature of the slurry, slurry flow rate, a flow rate adjustment valve operation state, 3-way valve operation state, a solenoid operation state, a slot-die operation state, a slurry coating bead shape, a base material transfer speed, and the like.

At step S10, the control module 96 monitors the slurry property based on the status data.

Specifically, at step S11, the control module 96 monitors the viscosity and temperature of the slurry by the in-line viscometer 40. At step S12, the control module 96 monitors the coating bead shape of the slurry by the coating bead sensor 80.

In addition, at step S20, the control module 96 monitors slurry pressures in each line in the piping and the slurry flow rate based on the status data.

Specifically, at step S21, the control module 96 monitors the slurry pressure in the main line 21 by the first pressure sensor 26a, the control module 96 monitors the slurry pressure in the supply line 22 by the second pressure sensor 26b, and the control module 96 monitors the slurry pressure in the circulation line 23 by the third pressure sensor 26c. At step S22, the control module 96 monitors the slurry flow rate by the flow meter 50.

At step S30, the control module 96 determines whether a process condition change event has occurred.

As described above in connection with the coating system embodiment, the process condition change event may include a change of slurry property of the viscosity and/or the temperature, a change of the slurry flow rate, insufficient slurry supply, excessive slurry supply, and abnormal base material transfer speed. For example, the control module 96 determines that the process condition change event has occurred when any of the listed changes is detected.

At this time, when the process condition change event has occurred (S30-Yes), the control module adjusts the process condition based on reference data matching the process condition change event, at step S40.

Figure 10:
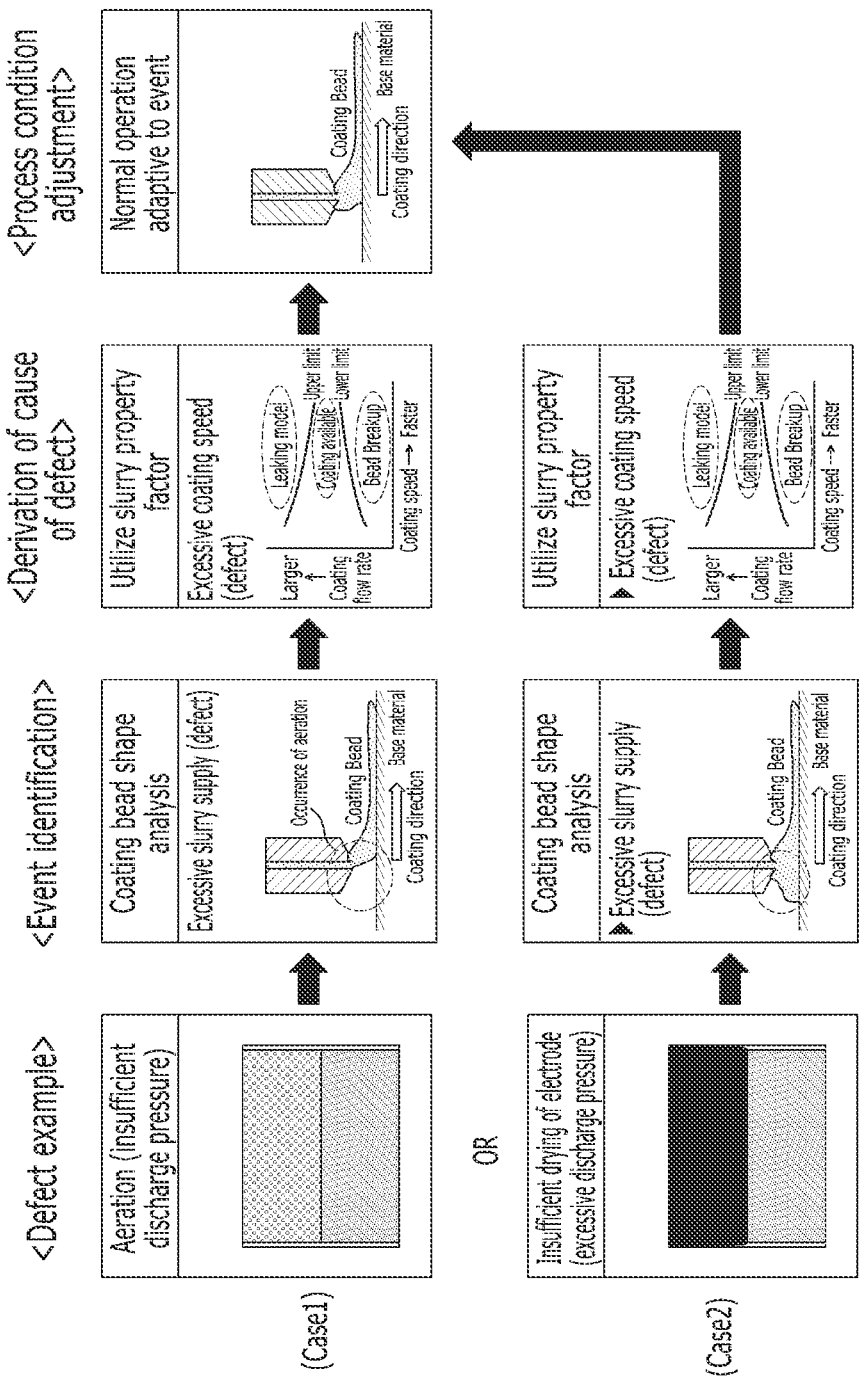
FIG. 10 shows an example of a process condition adjustment according to the occurrence of a change event according to an exemplary embodiment.

FIG. 10 shows an example of a process condition adjustment according to the occurrence of a change event according to an exemplary embodiment.

Specifically, FIG. 10 illustrates two example cases of (Case 1) an aeration defect due to an insufficient discharge pressure of the slot-die 70 and (Case 2) an electrode drying defect due to an excessive discharge pressure.

In case of Example 1, the control module 96 detects an occurrence of an insufficient slurry supply event based on the coating bead shape in advance to prevent defects due to the insufficient discharge pressure.

At this time, the control module 96 may derive at least one cause among excessive coating speed and insufficient discharge pressure by using slurry property factor analysis based on current status data. For example, the control module 96 identifies that the moving speed of the base material is excessively high compared to the slurry flow rate at the slot-die 70, or that the slurry flow rate at the slot-die 70 is excessively low compared to the moving speed of the base material.

The control module 96 may automatically adjust the coating process condition adaptively to the process condition change event by applying a feedback control based on reference data matching the cause of change. For example, the control module 96 may control at least one of pressure frequency adjustment of the pulseless pump 30, moving speed adjustment of the base material, gap adjustment of the slot-die 70, and flow rate adjustment of the flow rate adjustment valve 60.

For example, in the case of Example 2, the control module 96 detects an occurrence of an excessive slurry supply event based on the coating bead shape to prevent defects due to the excessive discharge pressure.

The control module 96 may derive at least one cause among decreased and excessive discharge pressure by using slurry property factor analysis based on current status data.

In addition, the control module 96 may automatically adjust the coating process condition adaptively to the process condition change event by applying a feedback control based on reference data matching the cause of change.

Referring back to FIG. 9, when the process condition change event is not detected (S30-No), the control module 96 identifies a current operation is the normal operation, and stores and manages the status data collected over time in the DB 94, at step S50.

In addition, at step S60, the control module 96 generates reference data for normal coating bead formation of the slot-die 70 correlated to the status data, and stores and manages the reference data in the DB 94.

Thereafter, at step S70, the control module 96 uses the status data and the reference data to automatically adjust the process condition according to the changed condition when a process condition change event occurs later.

Meanwhile, FIG. ii shows a flow rate control method in an initial stage of a coating operation according to an exemplary embodiment.

Figure 11:
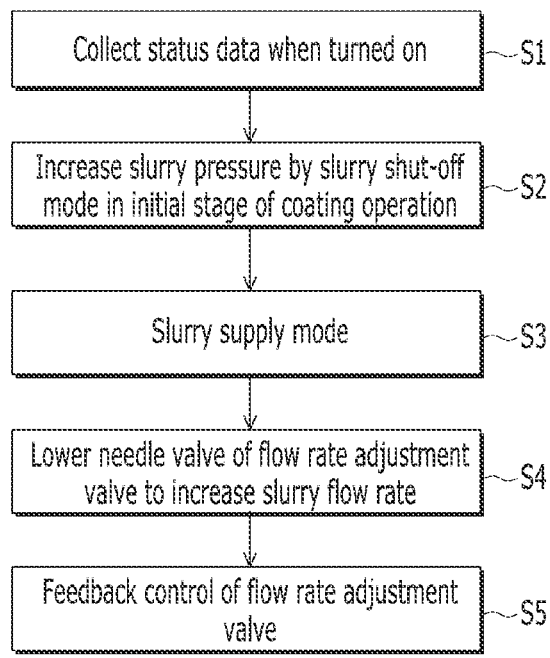
FIG. 11 shows a flow rate control method in an initial stage of a coating operation according to an exemplary embodiment.
Figure 12:
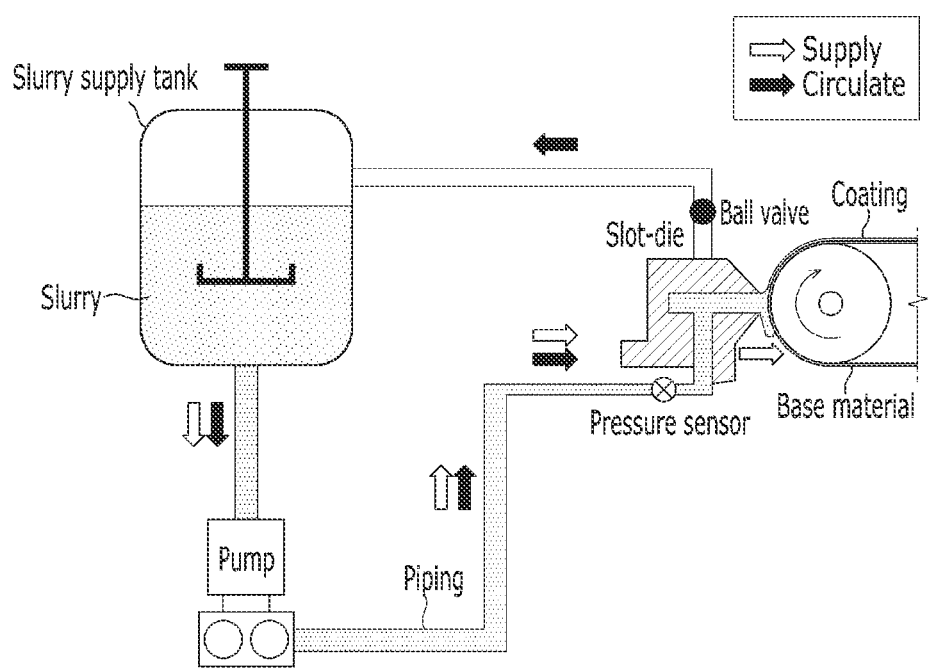
FIG. 12 shows a slurry supply and circulation structure in the conventional slot-die coating process.

That is, the flow rate control method in an initial stage of a coating operation shown in FIG. 11 may be understood as an initial flow rate control method that may be performed before the coating method for a secondary battery shown in FIG. 9.

When the coating system 1 is turned on, at step S1, the control module 96 collects status data measured by various sensors and devices configured in the coating system 1 through the interface module 91.

In order to sufficiently form the discharge pressure of the slot-die 70 that may become insufficient in the initial stage of the coating operation, at step S2, the control module 96 controls the piping 20 to the slurry shut-off mode and operates the pulseless pump 30 to increase a slurry pressure in the piping 20.

At step S3, the control module 96 controls the piping 20 to the slurry supply mode.

At step S4, the control module 96 increases the initial slurry flow rate by controlling the flow rate adjustment valve 60. For example, in the initial stage of the coating operation, in response to a control signal of the control module 96, the needle valve of the flow rate adjustment valve 60 may be lowered to decrease the cross-section of the flow rate adjustment valve 60 to increase the slurry flow speed at the downstream side of the flow rate adjustment valve 60. At this time, the slurry stored in the supply tank 10 is supplied to the slot-die 70 through the supply line 22, and an appropriate coating discharge pressure may be promptly achieved as the slurry flow pressure is compensated by the increase of the flow speed and the pipe pressure.

At step S5, the control module 96 adjusts, in a feedback control manner, the flow rate of the flow rate adjustment valve 60 to be appropriate for reference data matching the slurry property of volume and mass of slurry measured by the flow meter 50.

It is described that the exemplary coating method for a secondary battery according to an exemplary embodiment is executed by the control module 96, but the embodiment is not limited thereto. It may be understood that the subject of the control module 96 may be implemented in various forms, such as at least one processor including a memory that is configured to execute a preset program having instruction of the above described steps. It may also be understood that the control module 96 may not be a strictly separated part and instead, the coating controller 90 or the coating system may collectively perform the above described functions of the control module 96.

As such, according to an exemplary embodiment, the loading level (L/L) uniformity, an important specification item of coating operation, may be secured by automatically controlling the adjustment of the process condition according to the slurry property change in real time.

In addition, by obtaining status data through an in-line viscometer and a coating bead sensor, and performing control adapted to process condition changes based on the reference data, it is possible to improve electrode quality and establish a standard working method.

In addition, in the initial stage of the coating operation, slurry flow rate may be compensated by controlling the piping configuration to the shut-off mode and controlling the flow rate adjustment valve, and thus, coating discharge pressure may be promptly achieved, thereby preventing loss of slurry and base material.

The exemplary embodiments of the present invention described above are not only implemented by the apparatus and the method, but may be implemented by a program for realizing functions corresponding to the configuration of the embodiments of the present invention or a recording medium on which the program is recorded.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A coating system for a battery, the coating system comprising:

a supply tank connected to a slot-die and configured to store a slurry;

an in-line viscometer configured to measure viscosity and temperature of the slurry;

a flow meter configured to measure a flow rate of the slurry;

a flow rate adjustment valve configured to adjust the flow rate according to a feedback signal based on the flow rate measured by the flow meter;

a coating bead sensor configured to detect a slurry coating bead shape of a coating bead at a time at which the coating bead is discharged from the slot-die to a base material;

a coating controller configured to detect a process condition change event by monitoring a slurry property and the slurry coating bead shape in real time and to control the flow rate of the flow rate adjustment valve based on reference data corresponding to a changed slurry property;

a pulseless pump configured to generate a pressure in piping of the coating system;

a 3-way valve configured to convert a flow direction of the slurry from a main line from the pulseless pump to a supply line toward the slot-die or to a circulation line toward the supply tank;

a solenoid valve configured to open or close the circulation line; and at least one pressure sensor installed in the piping and configured to measure slurry pressure, wherein the coating controller is configured to control the piping according to a circulation mode during a standby for a coating operation, a supply mode during the coating operation, and a shut-off mode after finishing the coating operation, and wherein, in an initial stage of the coating operation, the coating controller is configured to control the piping to the shut-off mode to increase the slurry pressure in the main line to a level higher than a basic slurry supply pressure of the pulseless pump.

2. The coating system of claim 1, wherein, in the circulation mode, the coating controller is configured to control the flow rate adjustment valve to be open, control the 3-way valve to be open with respect to the circulation line and closed with respect to the supply line, and control the solenoid valve to be open.

3. The coating system of claim 1, wherein, in the supply mode, the coating controller is configured to control the flow rate adjustment valve to be open, control the 3-way valve to be open with respect to the supply line and closed with respect to the circulation line, and control the solenoid valve to be closed.

4. The coating system of claim 1, wherein, in the shut-off mode, the coating controller is configured to control the flow rate adjustment valve to be open, control the 3-way valve to be open with respect to the circulation line and closed with respect to the supply line, and control the solenoid valve to be closed.

5. The coating system of claim 1, wherein the flow rate adjustment valve is configured to adjust the flow rate to a same pressure in the circulation mode and the supply mode.

6. The coating system of claim 1, wherein the flow rate adjustment valve is configured to adjust the flow rate to match the reference data according to a feedback signal applied by the coating controller based on a volume and mass of the slurry measured by the flow meter.

7. The coating system of claim 1, wherein the coating bead sensor comprises at least one of a vision sensor, a laser, an ultrasonic wave, or a photodiode configured to detect the slurry coating bead shape.

* * * * *